Aug. 9, 1960  J. W. PACKIE ET AL  2,948,671
FLUID HYDROFORMER REACTOR DISTRIBUTOR
Filed Nov. 14, 1955  3 Sheets-Sheet 1
FIGURE - I
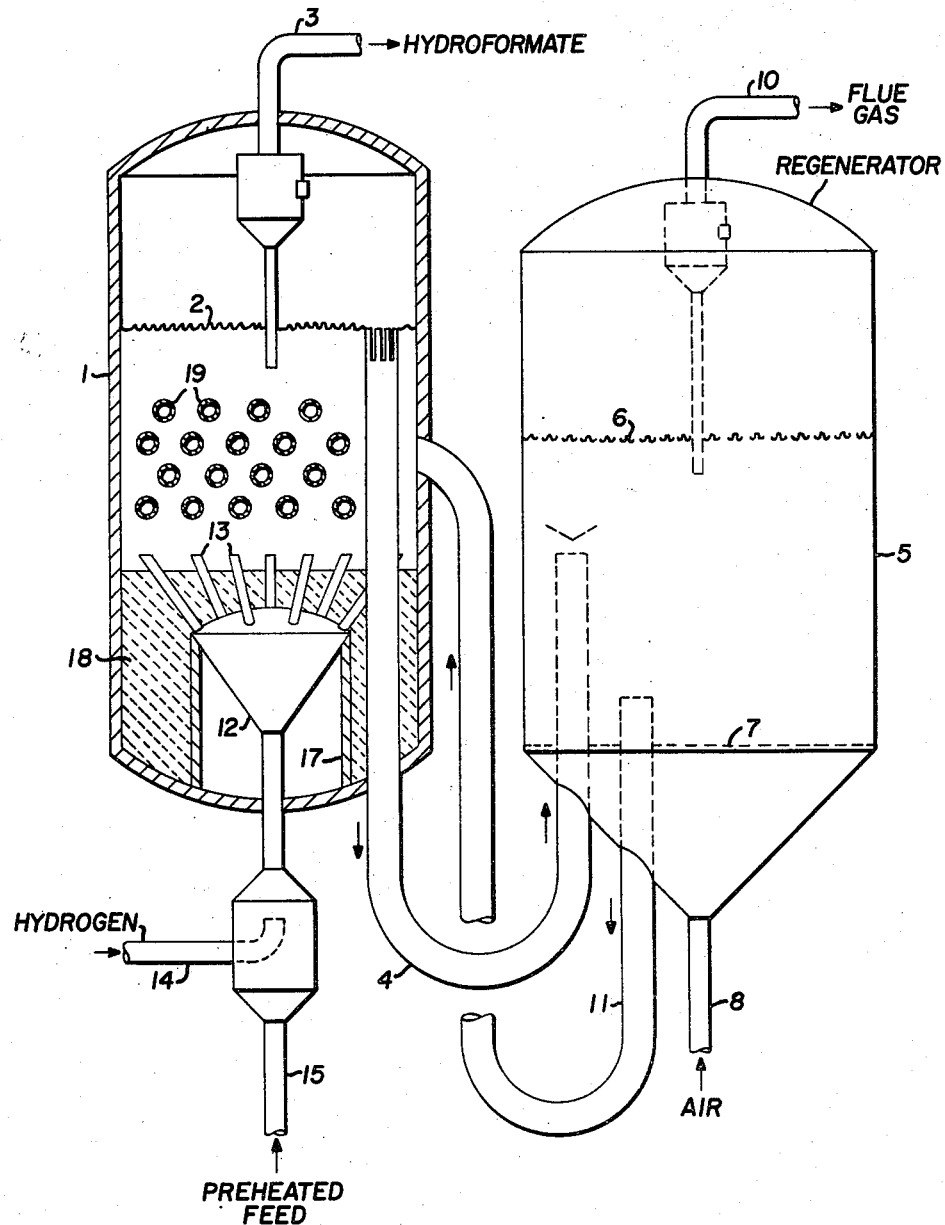
John W. Packie
Cyril O. Rhys, Jr.  Inventors
By Lee A. Strimbeck Attorney Aug. 9, 1960 J. W. PACKIE ET AL 2,948,671
FLUID HYDROFORMER REACTOR DISTRIBUTOR
Filed Nov. 14, 1955 3 Sheets-Sheet 2
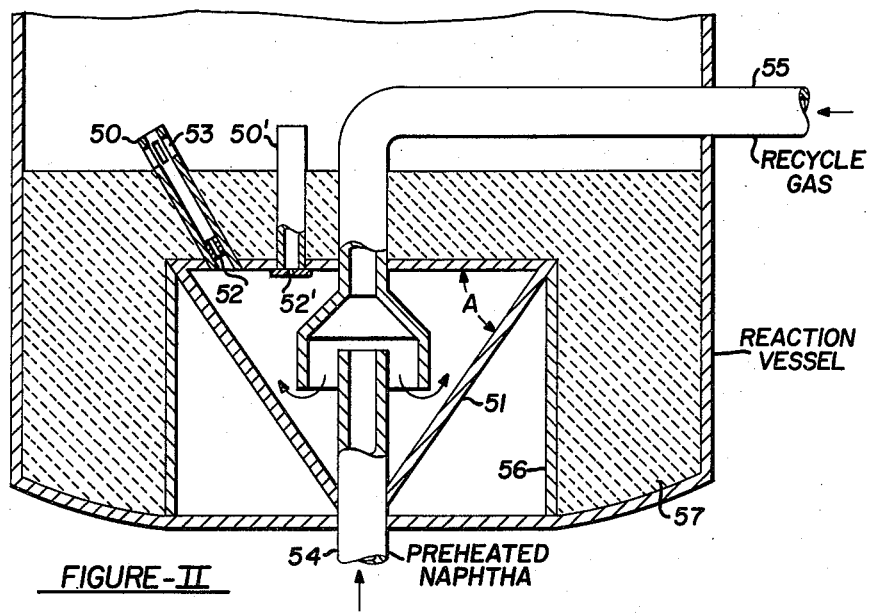
FIGURE-II
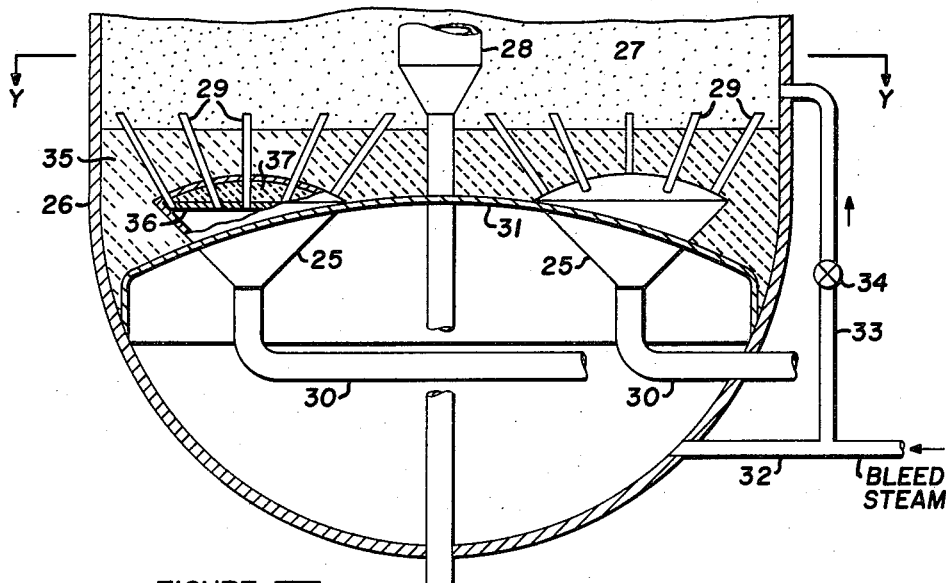
FIGURE-III
John W. Packie
Cyril O. Rhys, Jr.    Inventors
By Lee A. Strimbeck Attorney

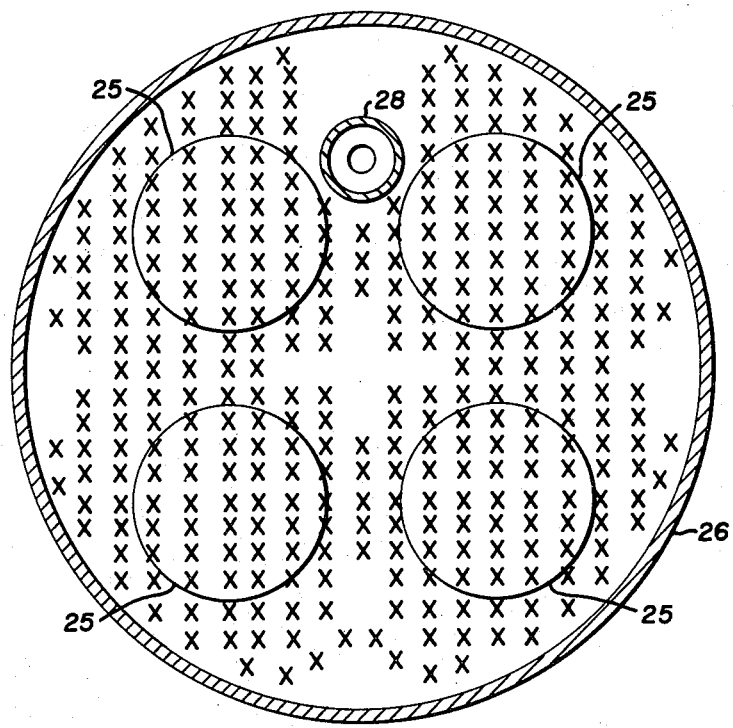
FIGURE - IV

United States Patent Office 2,948,671
Patented Aug. 9, 1960

2,948,671

FLUID HYDROFORMER REACTOR DISTRIBUTOR

John W. Packie, Maplewood, and Cyril O. Rhys, Jr., Morristown, N.J., assignors to Esso Research and Engineering Company, a corporation of Delaware Filed Nov. 14, 1955, Ser. No. 546,528

7 Claims. (Cl. 208—134)

This invention relates to an improved method and apparatus for introducing and distributing gasiform reactants into a fluidized solids reaction bed of a catalytic hydrocarbon conversion process. It is more particularly concerned with an improved distributor for introducing gasiform reactants into a dense, turbulent, fluidized catalyst bed of a hydroforming process whereby thermal degradation of the reactants is minimized, and improved contacting between the reactants and catalyst is obtained.

In brief compass, this invention proposes apparatus for the hydroforming of naphthas which comprises, in combination, a vertical elongated reaction vessel, a fluidized bed of particulate hydroforming catalyst therein, and distributing means for uniformly introducing a preheated gasiform reactant into the lower portion of the fluidized bed. The distributing means more particularly comprises a top enclosed, inverted cone-shaped inlet chamber within the lower portion of the reaction vessel, conduit means for admitting the gasiform reactant into the cone-shaped inlet chamber, and a plurality of upwardly projecting discharge nozzles connected with the top portion of the cone-shaped inlet chamber for passing the gasiform reactant therefrom uniformly into the fluidized bed. Each of the discharge nozzles has an orifice so sized that the velocity of gases during normal operation passing the orifice is above 140 feet per second. The number and size of the discharge nozzles is selected so that the discharge velocity of gases into the bed is in the range of 50 to 125 feet per second whereby catalyst attrition is avoided. The inlet chamber and nozzles are also designed so that the holding time of the gases, which are customarily preheated, therein is under 1.0 second, whereby unnecessary thermal degradation of the reactants is avoided.

In fluidized solids vessels over 12 feet in diameter, it is preferred to use a plurality of the above-described cone-shaped inlet chambers with injection nozzles secured to the top thereof arranged in a symmetrical pattern. When a plurality of cones is used, it is also preferred to place a dished metal membrane in the vessel in combination with the cones, to create a solids-free area in the lower portion of the vessel. A refractory fill is also preferably placed around the distributing means to protect it.

This invention is primarily applicable to catalytic conversion processes wherein a vaporized hydrocarbon feed amenable to thermal degradation is introduced into a fluidized solids reaction bed to be converted. Such processes as catalytic cracking of gas oils, reforming of naphthas, desulfurization of petroleum distillates, etc. are typical. It has particular applicability to the fluid hydroforming of petroleum naphthas to improve their octane value.

The invention is more generally applicable, however, to any fluidized solids process wherein it is desired to uniformly and intimately mix a gasiform reactant with a bed of fluidized solids. Thus, the invention will find use in processes of coal gasification, hydrogenation, catalyst regeneration, carbonaceous solids combustion, shale distillation, ore roasting, and the like.

The process of fluid hydroforming of naphthas has become well known. Although used primarily to secure octane improvement of gasoline, it also finds use in the production of aromatics and hydrogen. The feed stock to this process is typically paraffinic, naphthenic, sweet or sour naphthas, cracked naphthas, or coker naphthas boiling in a range within the limits of about 100 to 430° F. Under the influence of temperature and a hydroforming catalyst and in the presence of hydrogen, reactions such as dehydrogenation, dehydroisomerization, dehydrocyclization, isomerization, etc. occur to alter the hydrocarbon structure of the feed. Some other subsidiary reactions such as desulfurization and olefin saturation also occur.

In carrying out the hydroforming reaction, a fluidized bed of hydroforming catalyst is maintained in a reaction zone at a temperature in the range of 750° to 1000° F. The vaporized feed is introduced in the bed and converted. The reaction occurs in an atmosphere of hydrogen. Recycled hydrogen recovered from the products is customarily used. To provide the necessary heat for the endothermic reaction, the naphtha feed is preheated up to temperatures as high as 1000° F., and the recycled hydrogen is preheated up to a maximum of about 1200° F. When continuous external regeneration facilities are used, some of the reaction heat is supplied by the circulating catalyst. Customarily, pressures may range from 50 to 250 p.s.i.g., with higher pressures in this range being preferred. For some cases, higher pressures about to 1000 p.s.i.g. may be used. Feed rates may range from 0.2 to 5.0 v./v./hr. (volume of liquid feed/volume of catalyst/hour), and recycle gas rates may range from 2000 to 7000 s.c.f. per barrel of feed with the recycle gas containing over 50% hydrogen.

In conventional hydroforming, hydroforming catalysts such as platinum, cobalt molybdate, and chrome-alumina catalysts are used. Because this is a fluidized solids process, it is preferred to use an attrition-resistant catalyst such as molybdena on an activated alumina support.

While the process may be non-regenerative and the catalyst removed for periodic regeneration as necessary, it is preferred in this invention to use continuous external regeneration facilities wherein catalyst withdrawn from the reactor is oxidatively regenerated at temperatures in the range of 1050 to 1300° F. Heat conservation means such as a shot circulation system, using an inert particulate heat carrier, may be used in the practice of this invention, and heat may be supplied to the reactor and removed from the regeneration by other conventional direct or indirect heat exchange means.

Previously proposed fluid hydroforming processes have suffered from some disabilities. To obtain good yields and conversions, it is essential that uniform and positive contacting between the catalyst and reactants be obtained. In some operations contacting has been so poor that the catalyst bed has coked up, at least in part, and became immobile. Because in most cases it is necessary to highly preheat the feed, it has been found essential to provide minimum holding times in the reactant distributing means in the reactor to avoid unnecessary thermal degradation. With conventional perforated grids, it has been found that as much as 6.9 volume percent of $C_5+$ material (based on feed) can be lost at holding times of only about 3.7 seconds. Because a finely divided catalyst is used, there has been some difficulty experienced in maintaining the reactant distributor means free from catalyst. There has been a desideratum for a reactor distributor that is self-sealing and readily cleanable, as after periods of shutdown for turn-around.

It is also essential that the velocity at which the reactants are admitted to the fluid bed be maintained sufficiently low as to avoid catalyst attrition.

Many of the previously proposed fluid hydroforming designs have failed to meet one or more of the above requirements.

The present invention provides a gasiform reactant distributor for fluidized solids vessels that answers the above requirements and solves other problems as will appear from the following description of the drawings attached to and forming a part of this specification.

In the drawings:

Figure I depicts hydroforming process using the improved reactant distributor of this invention.

Figure II illustrates in section a portion of a reactant distributor and discharge nozzles in larger detail.

Figure III shows an embodiment of this invention wherein a plurality of distributors is used in combination with a metallic membrane in a hydroforming reaction vessel, and Figure IV is a plan view of the reactor of Figure III taken along the indicated section line Y—Y.

Referring now to Figure I, a hydroforming process incorporating the teachings of this invention is illustrated in a simplified schematic manner. In commercial operation, a considerable amount of adjunctive equipment such as flow meters, valves, surge tanks, heat exchangers, etc. would, of course, be provided.

Reaction vessel 1 contains a bed of fluidized hydroforming catalyst having an upper level 2. Reaction products are recovered overhead from vessel 1 via line 3, after having entrained solids removed in a cyclone system. The recovered products may be further treated as desired as by fractionation, blending, etc. There is recovered from the products a recycle stream containing, preferably, over 50% free hydrogen.

To remove carbonaceous and contaminating deposits from the hydroforming catalyst, a portion of the fluidized bed is withdrawn by line 4, and transferred to regenerator 5. Air or other free-oxygen containing gas is admitted to the base of regenerator by line 8 to fluidize and oxidatively regenerate the catalyst. The fluidized catalyst is supported on a foraminous grid 7 and has an upper level 6. Flue gases are withdrawn from regenerator 5 via line 10 after having entrained solids removed in a cyclone system. Regenerated and heated catalyst is transferred by line 11 to vessel 1.

According to this invention, the gasiform reaction products are uniformly distributed within the reaction vessel 1 via a cone-shaped inlet chamber 12 having a plurality of small discharge nozzles 13, each having an orifice. The recycled hydrogen supplied by line 14 is mixed either externally as shown, or internally with the naphtha admitted to the cone by line 15. The pressure drop through the nozzles is large enough, preferably 2 to 5 p.s.i., to cause the mixed gases to distribute evenly to the nozzles of the cone. The gases issue from the nozzles uniformly spreading across and uniformly fluidizing the catalyst bed. The recycled gas and vaporized feed are preferably highly preheated. When a single cone is used, they may be mixed externally or internally within the cone; and when a multiplicity of cones is used, the mixing of feed and recycled gas is preferably done externally of the reaction vessel.

The cone, nozzles, and inlet lines are so sized that relatively high velocities are secured, which result in low holding times, with a moderate pressure drop.

The cone is supported by a cylindrical form 17 and a refractory fill 18 is placed around the support and discharge nozzles.

Distributing baffles designed to destroy large gas bubbles can be used in the combination with the distributing means to increase the efficiency of contacting between the gases and solids. These baffles can comprise, for example, staggered rows of horizontal pipes 19, disc and doughnut baffles, "egg-crate" baffles, etc.

Referring to Figure II, a cone of slightly different design and two nozzles are shown in greater detail. The drawing also illustrates one method of internally mixing the reactants. Nozzles 50 and 50' connect with the top portion of cone 51 and have near their inlets, flow-restricting devices or orifices 52 and 52'. These orifices serve to maintain the velocity of gases at this point during normal operation above about 140 feet per second and to provide adequate pressure drop to insure good gas distribution. The increase in the size of the nozzle beyond this point permits, however, the reactive gases to be discharged into the catalyst bed at velocities only in the range of about 50 to 125 feet per second, whereby appreciable catalyst attrition is avoided, while finely divided catalyst is prevented from back-flowing into the distributor. It has been found that with a molybdena-alumina catalyst, velocities of about 250 feet per second result in a attrition rate in the order of 0.3 pound per barrel of feed, while at velocities of about 100 feet per second, the attrition rate is only about 0.05 pound per barrel of feed.

The nozzles preferably discharge directly into the catalyst bed as shown by nozzle 50', i.e., it is open ended. This permits, if catalyst finds its way into the cone, the distributing system to be readily cleaned or blown free of catalyst. The ends of the nozzles can, however, be sealed off and provided with elongated discharge openings or slots 53 to obtain better mixing within the bed. In cases where the slots face other equipment surfaces and erosion may become a problem, the slot may be blanked off and the other suitably increased in size, or a wearplate can be placed opposite the slot. Instead of slotting the ends of the nozzles, other exit means can be used, for example, they can be made fan-shaped.

While the cone can have a flat top surface as in Figure II, it is preferred to use a dished head on the cone for reason of strength, even though a horizontal baffle be used in the cone to decrease gas residence time.

During times when the equipment is shut down or during process upsets, some catalyst may find its way into the nozzles and cone. The cone is, therefore, provided with sides having a slope (angle A), preferably above 45° from the horizontal, at least above the angle of repose of the catalyst. In this way, the cone and nozzles are substantially self-cleaning although, in some instances, high pressure steam or other inert gas can be admitted to the cone to clean or clear it.

Preheated naphtha is supplied upwardly to the cone by line 54, and heated recycle gas is supplied by line 55 which encompasses line 54 as shown. In this way, mixing of the reactants within the cone is achieved. As before, the cone is supported by wall 56 and a refractory fill 57 is placed around the distributor nozzles. The cones are designed to have a minimum hold-up time and when the size of the reaction vessel is more than twelve feet in diameter, it is preferred to use a plurality of cones. It is preferred to provide one nozzle for every 0.90 to 1.10 feet of reactor cross-sectional area, as better distribution is obtained. In general, the nozzles will vary in inclination from 35° to 90° from the horizontal. The length of the nozzles is preferably within the range of 1 to 5 feet to minimize plugging tendencies.

By suitable design, the pressure drop of the gases in the cone and through the nozzles is maintained at about 3 p.s.i., although higher pressure drops can, of course, be used. It is much preferred that the holding time of the gases in the cone and through the nozzles be less than 1.0 second.

Referring now to Figures III and IV, a multi-cone design for a vessel of large diameter is shown. This design also incorporates a dished metal membrane in combination with the cones with a refractory fill thereabove, whereby the bottom of the vessel is maintained free of catalyst. This permits inspection of the cones and internal piping. In this design, four cones 25 are placed symmetrically in the bottom of reaction vessel 26. The reactants, including recycled hydrogen and vaporized naphtha which have been preheated and mixed externally of vessel 26, are supplied to the cones by individual lines 30. The reaction vessel contains, above the cones, a fluidized bed of hydroforming catalyst 27. Catalyst withdrawal line 28 is provided for circulating catalyst to the regenerator. Each cone contains a plurality of discharge nozzles 29, each of which has a suitable orifice. The nozzles are symmetrically arranged at varying angles on the top portion of the cones as shown by the X's on Figure IV. Of course the symmetry of the pattern is interrupted to permit the placement of necessary internals.

A thin metal membrane 31, below the top of the cones, is provided in the vessel. It loosely encompasses the cones allowing for expansion and contraction. To prevent pressure surges from damaging this membrane, the pressure is maintained substantially balanced thereover and the maintaining of this balance can be aided by supplying a bleed gas, e.g. steam, to the underside of the membrane by line 32. Arrangement is made by line 33 and pressure relief valve 34 to pass steam to the top of membrane 31 in case the distributing means plugs up.

As a further seal, to protect the membrane and to provide some support for the discharge nozzles, a refractory fill 35 comprising, for example, a layer approximately 6" thick of KS–4 refractory on top and SK–7 castable insulation as the remaining fill, is placed on top of the membrane. The discharge nozzles extend a few inches above this refractory fill.

The cones may have the dished head design shown in Figure I but this can be further improved upon by inserting a horizontal baffle 36 in the cones to decrease vapor holding time, and extending the discharge nozzles through the plates as shown by the left-hand cone of Figure III. The space between baffle 36 and the dished head can be advantageously filled with refractory 37.

To make this invention clear, the following specific example of the equipment illustrated in Figures III and IV is presented.

*Example*

Equipment:
Vessel diameter_____ 21½ ft.
Height of catalyst bed
  above refractory fill____ 47¼ ft.
Number of cones_____ 4.
Angle of cone walls_____ 45°.
Cone diameter at top_____ 5½ ft.
Volume of single cone_____ 24 cu. ft.
Cone spacing_____ ℄ on 8' 9" sq.
Nozzles/cone_____ 2 cones with 80 each, 2 cones with 83 each.
Maximum nozzle length____ 3½ ft.
Minimum nozzle length____ 1½ ft.
Internal diameter of
  nozzles_____ 1½ in.
Orifice diameter in nozzles. 1 inch.

Operating conditions:
Catalyst, molybdena-alumina,
  average diameter_____ 50 microns.
Bed temperature_____ 920° F.
Bed density_____ 36 lbs./cu. ft.
Pressure @ cyclone outlet__ 198 p.s.i.
Catalyst/oil ratio_____ 1.2.
Hydrogen gas recycle rate__ 5600 s.c.f./bbl. feed.
Fresh feed rate, 180° to
  350° F. naphtha_____ 22,200 bbl./day.
Inlet catalyst temperature__ 1125° F.
Temperature of recycle gas
  and vaporized feed_____ 1090° F.
Velocity of gases in nozzle
  at orifice_____ 198 ft./sec.
Velocity of gases as admitted
  to bed_____ 88 ft./sec.
Holding time in cone and
  nozzles_____ 0.31 sec.
Pressure drop over cones and
  nozzles_____ 3.39 p.s.i.
Yield, 95 octane_____ 76.3%.

It can be seen then that this invention provides an improved method of operating a fluid hydroforming process wherein the gasiform reactants are injected into the lower portion of the catalyst bed from a central point at a velocity in the range of 50 to 125 feet per second, as a multiplicity of upwardly directed uniformly spaced discrete streams, the velocity of the reactants at some point in each of the discrete streams being above 140 feet per second, one of said discrete streams being provided every 0.90 to 1.10 square feet of bed cross-sectional area, and the total holding time of the reactants from the time of mixing until injection into the bed being less than 1.0 second. Through this combination of elements, better operability and improved performance is obtained.

Having described this invention, what is sought to be protected by Letters Patent is succinctly set forth in the following claims.

What is claimed is:

1. In a fluidized solids catalytic hydrocarbon conversion apparatus wherein a preheated gasiform hydrocarbon reactant amenable to thermal degradation is introduced into a dense turbulent bed of fluidized catalytic solids in a reaction vessel and converted therein, an improved reactant distributor for uniformly and rapidly introducing a gasiform reactant into said bed, which comprises, in combination: a top-enclosed cone-shaped inlet chamber having sides upwardly diverging more than 45° from the horizontal, said cone-shaped inlet chamber being located in the lower portion of said vessel, conduit means for admitting a gasiform reactant into the lower portion of said cone-shaped inlet chamber, a plurality of upwardly inclined elongated nozzles connecting to the top portion of said cone-shaped inlet chamber to pass gases therefrom into said bed in a uniform pattern, each of said nozzles having a flow-restricting orifice at the inlet end thereof whereby gases flowing through said orifice have a velocity above 140 ft./sec. at a pressure drop over said nozzles and cone-shaped inlet chamber in the range of 2.0 to 5.0 p.s.i., the number and size of said nozzles being such that the velocity of gases admitted to said bed is in the range of 50 to 125 ft./sec., and the holding time of gases in said cone-shaped inlet chamber and nozzles is under 1.0 sec.

2. The distributor of claim 1 wherein the upper ends of said nozzles are sealed, and elongated slots are provided near said upper ends to emit gases into said bed.

3. The distributor of claim 1 wherein a nozzle is provided for each 0.90 to 1.10 sq. ft. of horizontal cross-sectional area of said bed.

4. Apparatus for the hydroforming of naphthas which comprises, in combination, a vertically elongated reaction vessel, a fluidized bed of particulate hydroforming catalyst therein, distributing means for uniformly introducing a preheated gasiform reactant into the lower portion of said bed, said distributing means comprising a top-enclosed inverted cone-shaped inlet chamber in the lower portion of said reaction vessel, conduit means for admitting said gasiform reactant into said cone-shaped inlet chamber, and a plurality of upwardly projecting discharge nozzles connecting with the top portion of said cone-shaped inlet chamber for passing said gasiform reactant therefrom uniformly into said bed, each of said discharge nozzles having an internal orifice at the inlet end thereof so sized that the velocity of said reactant past said orifice is above 140 ft./sec., the number and size of said discharge nozzles being so selected that the discharge velocity of said reactant into said bed is in the range of 50 to 125 ft./sec.

and the reactant holding time in said cone-shaped inlet chamber and said nozzles is under 1.0 sec.

5. The apparatus of claim 4 wherein said vessel is over 12 feet in diameter, wherein a plurality of said cone-shaped inlet chambers arranged in a symmetrical pattern is used, wherein said gasiform reactant comprises vaporized naphtha and recycled free hydrogen containing gas, wherein a dished metal membrane extending from the wall of said vessel and encompassing said cone-shaped inlet chambers below the top portion thereof creates a catalyst free area in the lower portion of said vessel, and wherein a layer of refractory extends from the upper portion of said membrane to just below the outlets of said nozzles.

6. The apparatus of claim 4 wherein baffles are placed in said bed above the distributing means to improve contacting between said gasiform reactant and catalyst.

7. An improved hydroforming process which comprises maintaining a dense turbulent bed of fluidized hydroforming catalyst in a reaction zone at hydroforming reaction conditions of temperature and pressure, continuously withdrawing catalyst from said dense bed, regenerating the withdrawn catalyst under fluidizing conditions in an external regeneration zone by contact with a free oxygen containing gas to remove carbonaceous deposits, returning the regenerated catalyst to the dense bed in the reaction zone, recovering vaporous conversion products overhead from said reaction zone, recovering a free hydrogen containing gas from said conversion products, heating the gas so recovered to a high temperature, mixing preheated vapors of hydrocarbons boiling in the naphtha range with the gas so heated, injecting the resulting mixture at a temperature above 1000° F. and a velocity in the range of 50 to 125 ft./sec. into said bed from a central point as a multiplicity of upwardly directed, uniformly spaced, discrete streams, the velocity of said mixture at some point in each of said discrete streams being above 140 ft./sec., one of said discrete streams being provided for every 0.90 to 1.10 sq. ft. of bed cross-sectional area, and the total holding time of said mixture from the time of mixing until injection into said bed being less than 1.0 sec.

References Cited in the file of this patent

UNITED STATES PATENTS

| | | |
|---|---|---|
| 2,432,344 | Sinclair | Dec. 9, 1947 |
| 2,472,844 | Munday et al. | June 14, 1949 |
| 2,606,863 | Rehbein | Aug. 12, 1952 |
| 2,650,084 | White | Aug. 25, 1953 |
| 2,740,752 | Anhorn | Apr. 3, 1956 |
| 2,841,476 | Dalton | July 1, 1958 |